United States Patent [19]
Hanson et al.

[11] Patent Number: 5,920,162
[45] Date of Patent: *Jul. 6, 1999

[54] POSITION CONTROL USING VARIABLE EXCITER FEED THROUGH

[75] Inventors: Michael J. Hanson, Loves Park; Gregory I. Rozman, Rockford, both of Ill.

[73] Assignee: Sundstrand Corporation, Rockford, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/695,148

[22] Filed: Aug. 5, 1996

[51] Int. Cl.[6] .................................................. A63B 69/10

[52] U.S. Cl. ..................... 318/254; 318/439; 318/141; 322/10; 322/29; 290/14; 290/46

[58] Field of Search ............................. 322/59–61, 10–13, 322/29, 32; 290/38 R, 46, 36 R, 7–25; 318/254, 140–158, 792–815, 700–724

[56] References Cited

U.S. PATENT DOCUMENTS

| | | | |
|---|---|---|---|
| 3,813,589 | 5/1974 | Boice | 318/798 |
| 3,902,073 | 8/1975 | Lafuze | 290/46 |
| 4,330,743 | 5/1982 | Glennon | 322/10 |
| 4,524,316 | 6/1985 | Brown et al. | 318/809 |
| 4,616,166 | 10/1986 | Cooper et al. | 318/712 |
| 4,761,703 | 8/1988 | Kliman et al. | 361/23 |
| 4,937,508 | 6/1990 | Rozman | 318/254 |
| 5,068,590 | 11/1991 | Glennon et al. | 322/10 |
| 5,140,245 | 8/1992 | Stacey | 318/723 |
| 5,444,349 | 8/1995 | Rozman et al. | 318/716 |
| 5,461,293 | 10/1995 | Rozman et al. | 318/603 |
| 5,488,286 | 1/1996 | Rozman et al. | 322/10 |
| 5,493,200 | 2/1996 | Rozman et al. | 322/10 |
| 5,495,162 | 2/1996 | Rozman et al. | 322/10 |
| 5,495,163 | 2/1996 | Roxman et al. | 322/10 |
| 5,594,322 | 1/1997 | Rozman et al. | 318/254 |

*Primary Examiner*—David Martin
*Attorney, Agent, or Firm*—Jeffery J. Makeever

[57] ABSTRACT

A motor generator system in accordance with the invention includes a prime mover (21) for driving an output shaft (18); a main motor generator (16, 105), having a rotor driven by the output shaft, for producing electrical power on a plurality of stator phase windings (36a–36c) in response to the prime mover rotating the output shaft and for driving the output shaft in response to operation as a motor, an exciter (14, 102), having a rotor driven by the output shaft, for applying excitation to a field winding (34) of the main motor generator during operation for producing electrical power on the plurality of phase windings and for applying current to the field winding of the main motor generator to produce a magnetic field in the field winding during operation of the main motor generator as a motor, a time varying signal source (200) for applying a time varying signal having a fundamental frequency 202 to a field winding (28) of the exciter, a main inverter (114), responsive to signal (302) representing a rotary position of the rotor of the main motor generator, for commutating application of current to the at least one of the plurality of phase windings to control operation of the main motor generator during operation as a motor while simultaneously maintaining one of the plurality of phase windings in a non-commutated stated in which no current is cause to flow therein by the main inverter, circuitry (300), coupled to the stator phase winding maintained in the non-commutated state, for detecting an amplitude modulation of voltage across the non-commutated phase winding at twice the fundamental frequency representing the rotary position of the rotor of the main motor generator and producing the rotor position signal in response to the detected amplitude modulation to control commutation of current in at least one of the plurality of stator phase windings.

22 Claims, 5 Drawing Sheets

POSITION CONTROL USING VARIABLE EXCITER FEED THROUGH

TECHNICAL FIELD

The present invention relates to systems and methods of operation of a motor generator system for controlling commutation during synchronous motor operation.

BACKGROUND ART

Previously developed motor generator systems usually include an absolute rotor position sensor such as resolver, synchro, optical encoder or Hall effect devices for detecting the rotor position to provide proper commutation of switching of currents in the armature windings. For example, U.S. Pat. No. 3,902,073 discloses three hall devices mounted in the air gap of a permanent magnet generator (PMG) spaced 120 electrical degrees apart with respect to the permanent magnet pole pairs and in magnetic flux sensing relationship to the rotor permanent magnets. A voltage is generated across each Hall device which is proportional to the magnetic flux density applied thereto. Thus, as the rotor of the PMG rotates, the voltage across each Hall devices varies from zero to a maximum as a function of the flux density thereby generating three trapezoidal voltages spaced 120° apart. The output from each Hall device is representative of the position of the PMG rotor. If the rotor of the PMG is constructed to have the same number of pole pairs as the main motor generator and the poles of the PMG are aligned with the poles of the main motor generator, the main motor generator rotor position is known if the PMG rotor position is known. The output signals from the Hall devices are used to control switching of the ganged elements in cycloconverters to switch current to the proper winding in the armature of the main motor generator.

Use of an external position sensor is associated with a considerable expense in itself, associated electronics, wires and installation. Often the operating speed limits the accuracy of available position sensors such as, for example resolvers. Further operating temperature ranges in typical motor generator systems limit the accuracy of the Hall devices.

These problems are the motivating factors to use other means to detect rotor position. In the case of a brushless DC motor, a back electromotive force (EMF) approach was the most popular method of detecting rotor position. The back EMF signal contains information on the rotating magnetic rotor position $$E_{EMF} = K\Omega \sin \alpha$$

where:
K is a Constant
ω is angular speed
α is phase ∠

There are two methods of detecting back EMF voltage: the direct method and indirect method. The direct method is based on directly measuring the phase voltage. The phase voltage is equal to the back EMF when the phase is not energized and the winding is not short circuited.

Certain existing auxiliary power units (APU) do not utilize a PMG and therefore sensorless operation to produce commutation must be achieved by other means. Back EMF voltage of the main motor generator is zero at standstill and therefore can not be used for commutation at zero and low speeds. The ability to rapidly accelerate a synchronous motor generator which is used to start a prime mover such as a gas turbine in an APU is important when single phase excitation is used to avoid high voltage application to the excitor windings which can produce potential corona problems at high altitude.

To satisfy the above requirements one of the phase legs must be turned off, which requires 120° conduction in the commutation algorithm and the voltage reading must be taken after some delay following switching the motor winding off to assure complete current decay via the freewheeling diodes. This direct technique is described in a paper entitled "Microcomputer Control for Sensorless Brushless Motor" by Kenichi Iizuka et al., published in the IEEE Transactions On Industry Applications, Vol. IA-21, No. 4, May/June 1985.

The indirect method is based on estimating the back EMF from the motor terminal voltage and phase currents. This method is suitable for both 120° and 180° conduction. One technique of using this method is described in a paper entitled "A Position-and-Velocity Sensorless Control for Brushless DC Motor Using an Adaptive Sliding Mode Observer" by Takeshi Furuhashi et al., published in IEEE Transactions on Industrial Electronics, Vol. 39, No. 2, April 1992.

Since the back EMF voltage is zero at standstill and the signal to noise ratio is small at low speeds, the reliable determination of the rotor position is limited at low rotor speeds.

A method with a wider speed range is required for self-commutated sensorless operation. Such a method of using PMG as a position sensor for motor generator starting applications is described in U.S. Pat. No. 5,140,245. The system is equipped with a PMG which is used as an emergency electric power source and for control power during normal (generating) mode of operation. A multiphase output of the PMG is applied to a high resolution phase locked loop having a binary counter with an output phase locked to the PMG multiphase output and representing shaft position.

FIG. 1 illustrates a block diagram of a prior art brushless motor generator system which may be operated as a main generator and further as a motor to start a prime mover. A complete description of the system of FIG. 1 appears in U.S. Pat. No. 5,493,200 which is assigned to the assignee of the present invention and which is incorporated herein by reference in its entirety.

Referring now to FIG. 1, a brushless, synchronous motor generator system 10 includes a PMG 12, an exciter 14 and a main motor generator 16. The system 10 further includes a motive power shaft 18 connected to a rotor 20 of the system. The motive power shaft 18 may be coupled to a prime mover 21, which may comprise, for example, a gas turbine engine. The generator system 10 and the prime mover 21 may comprise portions of an aircraft APU or any other power conversion system.

The rotor 20 carries one or more permanent magnets 22 which are poles of the PMG 12. Rotation of the motive power shaft 18 causes relative movement between the magnetic flux produced by the permanent magnet 22 and a set of three-phase PMG armature windings 24a–24c mounted within a stator 26 of the motor generator system 10.

The exciter 14 has a field winding 28 disposed in the stator 26 and a set of three-phase armature windings 30a–30c disposed in the rotor 20. A set of three-phase main motor generator armature windings 36a–36c is disposed in the stator 26.

During operation in a generating mode, the PMG armature windings 24a–24c are coupled through a rectifier 38, a voltage regulator 40 and a pair of switches 42 and 44 to end taps 46a and 46b of the exciter field winding 28. As the motive power shaft 18 is rotated, power produced in the PMG armature windings 24a–24c is regulated in potential by voltage regulator 40, rectified by rotating rectifier 32 and applied to the main motor generator field winding 34. Rotation of the motive power shaft 18 and the field winding 34 induces the three-phase AC voltages in the main motor generator armature windings 36a–36c as is conventional.

Often, it is desirable to use the brushless generator 10 as a motor to bring the prime mover 21 up to self-sustaining speed. This operation is accomplished by providing electrical power to the main motor generator field winding 34 via the exciter 14 to produce a required magnetic field therein for motor operation, providing AC power to the main motor generator armature phase windings 36a–36c, via lines 48a–48c and suitably commutating the currents flowing in the phase windings 36a–36c to cause the motive power shaft 18 to rotate. This operation may be achieved by connecting an external electrical power source 50 to power conversion system 54. The power conversion system 54 may be a main inverter as described below which commutates the current in the windings 36a–36c in response to a rotor position signal representing the rotary position of the rotor of the main motor generator 16 and further an exciter inverter which provides the necessary alternating current to the exciter field winding 28 for operation as a motor. A series of switches 56a–56c, as well as the switches 42 and 44, are moved to the positions opposite that shown in FIG. 1 so that the power conversion system 54 is coupled to the end taps 46a and 46b of the exciter field winding 28. The power conversion system 54 is operated to supply power as appropriate to the phase windings 36a–36c and the field winding 28 to cause the motive power shaft 18 to rotate and thus develop motive power.

During operation in the generating mode, the switches 56a–56c are placed in the positions shown in FIG. 1 and the power conversion system 54 is operated to produce constant-frequency AC power on a load bus 60.

Commutation of the electrical currents in the output windings 36a–36c for operation as a motor is achieved under the control of a rotor position detector which utilizes inductance sensing of the inductance in the windings 36a–36c. See column 13, lines 58–67 through column 14, lines 1–10 of U.S. Pat. No. 5,493,200.

Additional motor generator systems of the assignee which may be used for power generators and/or starting applications of prime movers are disclosed in U.S. Pat. Nos. 4,330,743, 4,616,166, 4,937,508, 5,068,590, 5,495,162, 5,444,349, 5,488,286, 5,461,293 and 5,495,163 which patents are herein incorporated by reference in their entirety. None of these patents disclose detection of the position of the rotor of a main motor generator or an output shaft of a prime mover which drives at least the exciter and the main motor generator which is operated as a motor in response to applying a time varying signal having a fundamental frequency to the field winding of the exciter and detecting in a output (stator) phase winding of the main motor generator maintained in a non-commutated state an amplitude modulation of the voltage across each phase winding at twice the fundamental frequency which represents the rotary position of the rotor and producing a signal representing the rotary position of the main motor generator in response to the detected amplitude modulation of the voltage across each phase winding to control commutation of current in at least one of the plurality of output phase windings.

FIG. 2 illustrates a block diagram of a prior art motor generator system 100 operated in a motoring mode to start a prime mover having a permanent magnet generator (not illustrated), an exciter 102 and a main motor generator 105 all of which are driven by an output shaft (not illustrated) of a prime mover (not illustrated) with a configuration such as illustrated in the prior art of FIG. 1. The system 100 is operated in a starting mode with an AC source 106 providing three phase alternating current to a three-phase fullwave rectifier 108 which outputs DC potentials +V and −V on a DC bus 108. Exciter inverter 110 applies AC excitation to the field winding within the exciter 102. The rotor of the exciter 102 has induced therein three-phase current as a consequence of the field current. The rotating fullwave rectifier 104 produces three-phase fullwave rectification of the three-phase AC produced by the exciter rotor. The direct current produced by the rotating rectifier 104 is applied to the field winding of the main motor generator 105 which is contained in the rotor thereof. As illustrated, a rotating assembly 112 includes the rotor of the exciter, the three-phase fullwave rectifier 104 and the field winding of the main motor generator 105. A main inverter 114 commutates the application of three-phase alternating current to the at least one output winding of the main motor generator 105 which normally functions to produce three-phase 400 Hz alternating current in applications in air frames. The exciter inverter control 116 controls the activation of the exciter inverter 110. The main inverter 114 may be for example the inverter as illustrated in FIG. 4 of the assignee's U.S. Pat. No. 5,495,163. The exciter inverter control 116 may be for example the exciter inverter control disclosed in the FIG. 4 of the assignee's aforementioned U.S. Pat. No. 5,493,200. The main inverter control 118 and the rotor position sensor 119 may be for example in accordance with FIG. 2 of the assignee's U.S. Pat. No. 5,461,293.

DISCLOSURE OF THE INVENTION

The present invention utilizes feed through from the exciter winding of twice the fundamental frequency of excitation thereof which is detected synchronously in one of a plurality of stator phase windings of a main motor generator maintained in a non-commutated state during operation as a motor to determine rotor position of the main motor generator for control of commutation of current in all other commutated stator phase windings. The amplitude modulation of the voltage across each stator phase winding which is maintained in a non-commutated state represents the rotary position of the rotor of the main motor generator which is used to control commutation of current flow in an at least one and preferably all remaining commutated stator phase windings to produce motor operation for use with diverse applications such as but not limited to accelerating a prime mover such as a gas turbine in an APU to self-sustaining speed.

The sinusoidal excitation of the field winding of the exciter is fed through to the stator phase windings as a consequence of motor operation and is frequency doubled to produce a synchronization signal having a frequency of twice the frequency of the excitation which is applied to at least one synchronous detector also coupled to the phase winding maintained in a non-commutated state for detecting the amplitude modulation of the voltage across each non-commutated phase winding at twice the fundamental frequency. The detected amplitude modulation of the voltage across each non-commutated phase winding at twice the fundamental frequency is coupled to a low pass filter having a cutoff frequency below twice the fundamental frequency. A position detector is coupled to the output of the low pass filter and converts the cyclical signal from the low pass filter into a rotor position control signal representing the rotary position of the rotor of the main motor generator which is used to control commutation in a conventional manner.

In a preferred embodiment, a plurality of synchronous detectors, equal in number to a number of the plurality of phase windings, are utilized with each synchronous detector being coupled to a different one of the plurality of stator phase windings. A summer is coupled to an output of each of the plurality of synchronous detectors for continuously producing an output signal representing the detected amplitude modulation of the voltage across each non-commutated phase winding at twice the fundamental frequency. A plurality of low pass filters filter the outputs of each of the synchronous detectors with each low pass filter having an input coupled to an output of a different synchronous detector and an output coupled to the summer. Each low pass filter has a cutoff frequency below twice the fundamental frequency. A main inverter controls the commutation of current in the plurality of stator phase windings over 360° of rotation of the rotor of the main motor generator so that each stator phase winding is maintained in a non-commutated state for at least one time interval during the 360° during which time the amplitude modulation of the voltage is detected.

The main motor generator preferably has three stator phase windings with each stator phase winding being in a non-commutated state twice during the 360° of rotation of the rotor of the main motor generator with successive non-commutated states of each stator phase being space apart by 180°. A position detector is coupled to an output of the summer for producing the rotor position signal. The low pass filter prevents undesirable coupling of frequencies of twice the fundamental to the phase detector.

Preferably the motor generator system of the present invention further includes a permanent magnet generator. The permanent magnet generator, the exciter and the main motor generator have three electrical phases and rotors mounted on an output shaft of a primer mover. The permanent magnet generator, exciter and main motor generator are preferably brushless and the prime mover may be a gas turbine.

The present invention is an improvement over the prior art in not requiring shaft position sensors for control of commutation during synchronous motor operation. Commutation is achieved with inexpensive circuitry used for detecting amplitude modulation of the voltage across each non-commutated phase winding at twice the fundamental frequency of the excitation of the exciter winding representing the rotor position of the main motor generator. A conventional main inverter control is modified without substantial expense to always have one of the plurality of phase windings in a non-commutated state necessary for detecting the amplitude modulation of the voltage and further is modified without great expense to sequentially over a 360° rotation of the main motor generator deactivate each stator winding a plurality of times such as but not limited to 60° of deactivation followed by an activated commutated state of 120° followed by 60° of deactivation followed by 120° of an activated commutated state.

BRIEF DESCRIPTION OF THE DRAWINGS

Like reference numerals identify like parts throughout the drawings.

BEST MODE FOR CARRYING OUT THE INVENTION

Figure 1:
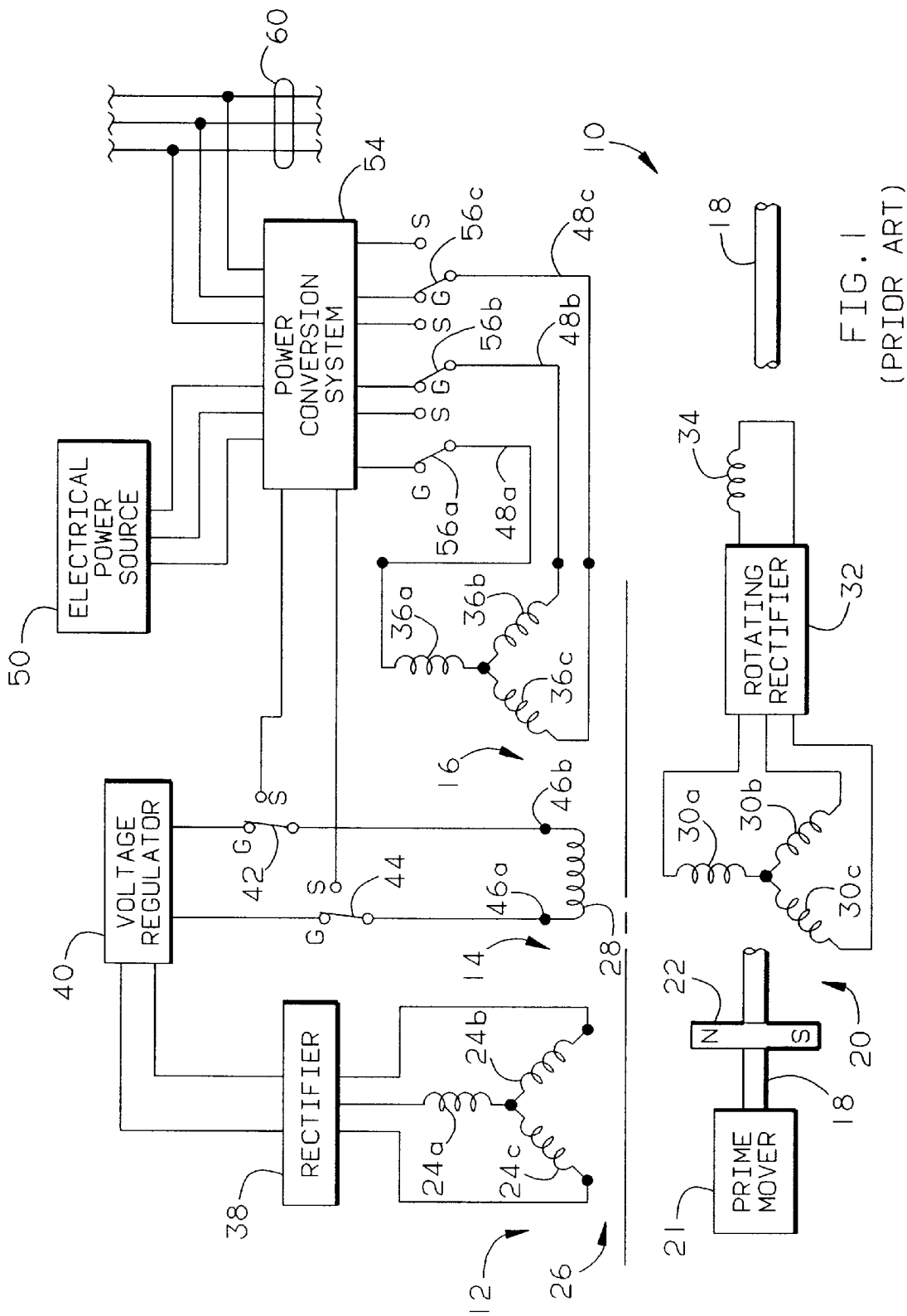
FIG. 1 is a block diagram of a prior art brushless motor generating system used for starting a prime mover and further a preferred form of a motor generator system in which the present invention may be practiced.
Figure 3:
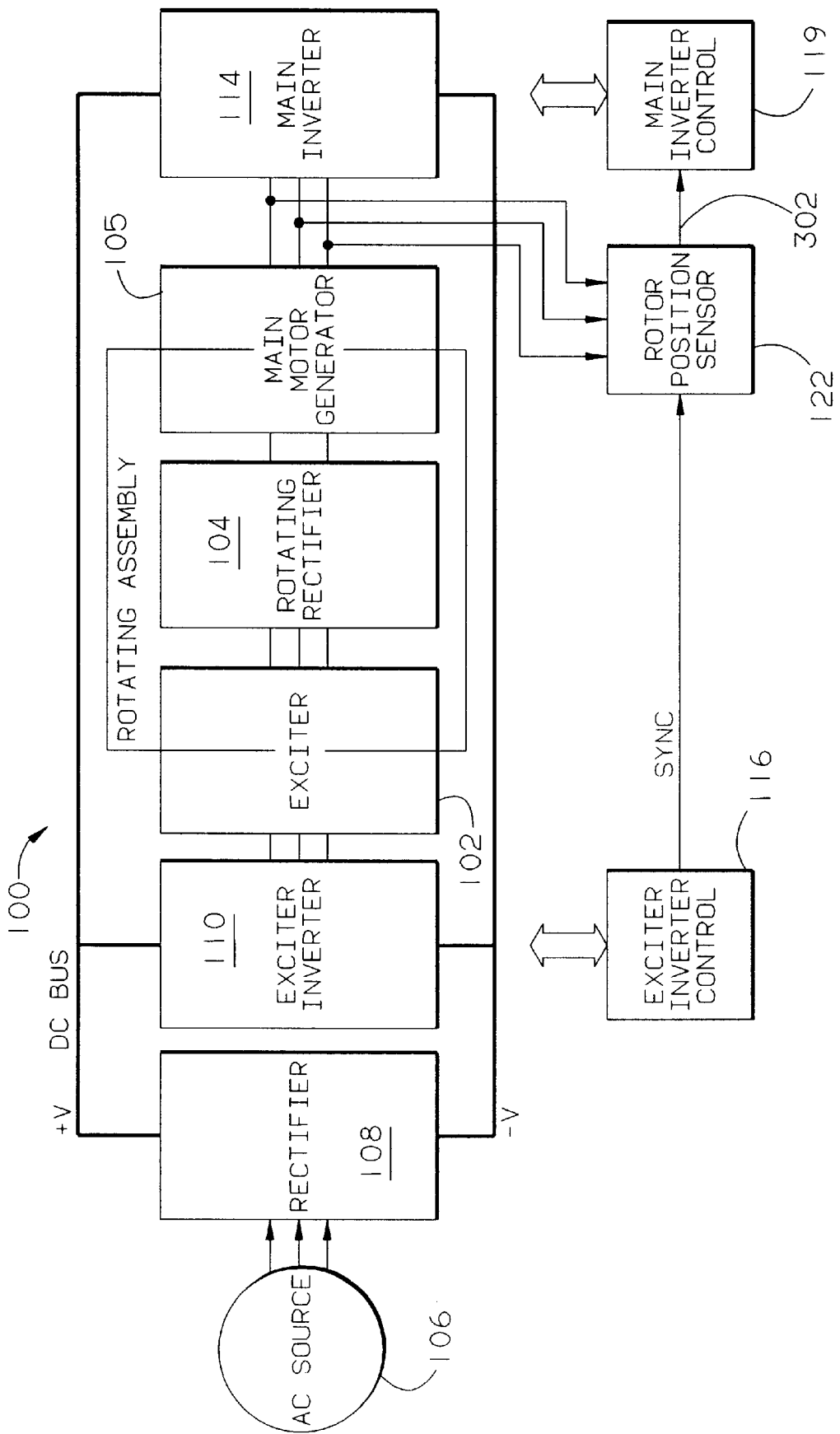
FIG. 3 is a block diagram of a preferred embodiment of a sensorless motor generator system used for starting a prime mover in accordance with the invention.

FIG. 3 illustrates a block diagram of an embodiment of a motor generator system 120 in accordance with the present invention used for starting a prime mover. The motor generator 120 system preferably contains a PMG (not illustrated), exciter 102 and main motor generator 105 having windings, rotors and a prime mover as illustrated in FIG. 1. The output shaft of a prime mover as illustrated in the prior art of FIG. 1 drives the rotor of the exciter 102 and the rotor of the main motor generator 105 in unison.

Figure 2:
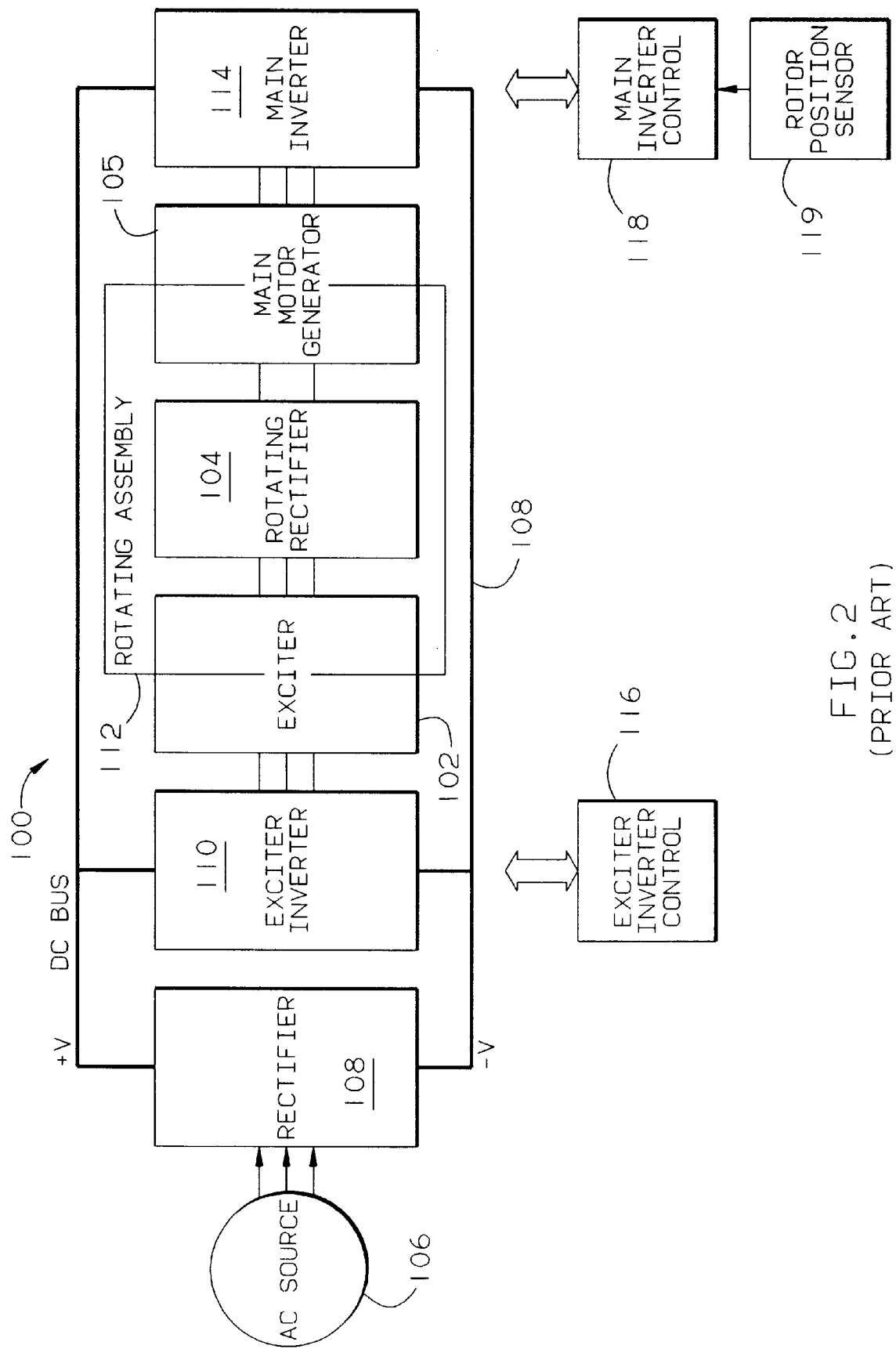
FIG. 2 is a block diagram of a brushless generator/motor system used for starting a prime mover.

The difference between the present invention used for starting of a prime mover as illustrated in block diagram form in FIG. 3 and the prior art of FIG. 2 is that the rotor position detector 122 detects the amplitude modulation of the voltage across each non-commutated phase winding of the main generator at twice the excitation frequency of the exciter 102 feed through to each of the stator phase windings of the main motor generator 105 maintained in a non-commutated state which is synchronously detected into a rotor position signal representing the position of the aligned rotors of the motor generator system 120 and the output shaft of the prime mover. As a consequence of the rotor of the exciter 102 and the rotor of the main motor generator 105 being mounted on and driven in unison by the output shaft of the prime mover as for example illustrated in the prior art of FIG. 1 (not illustrated in FIG. 3.), the rotor position signal representing the position of the rotors of the motor generator system 120 is used by the main inverter control 119 to control commutation of the main inverter in accordance with the prior art.

Figure 4:
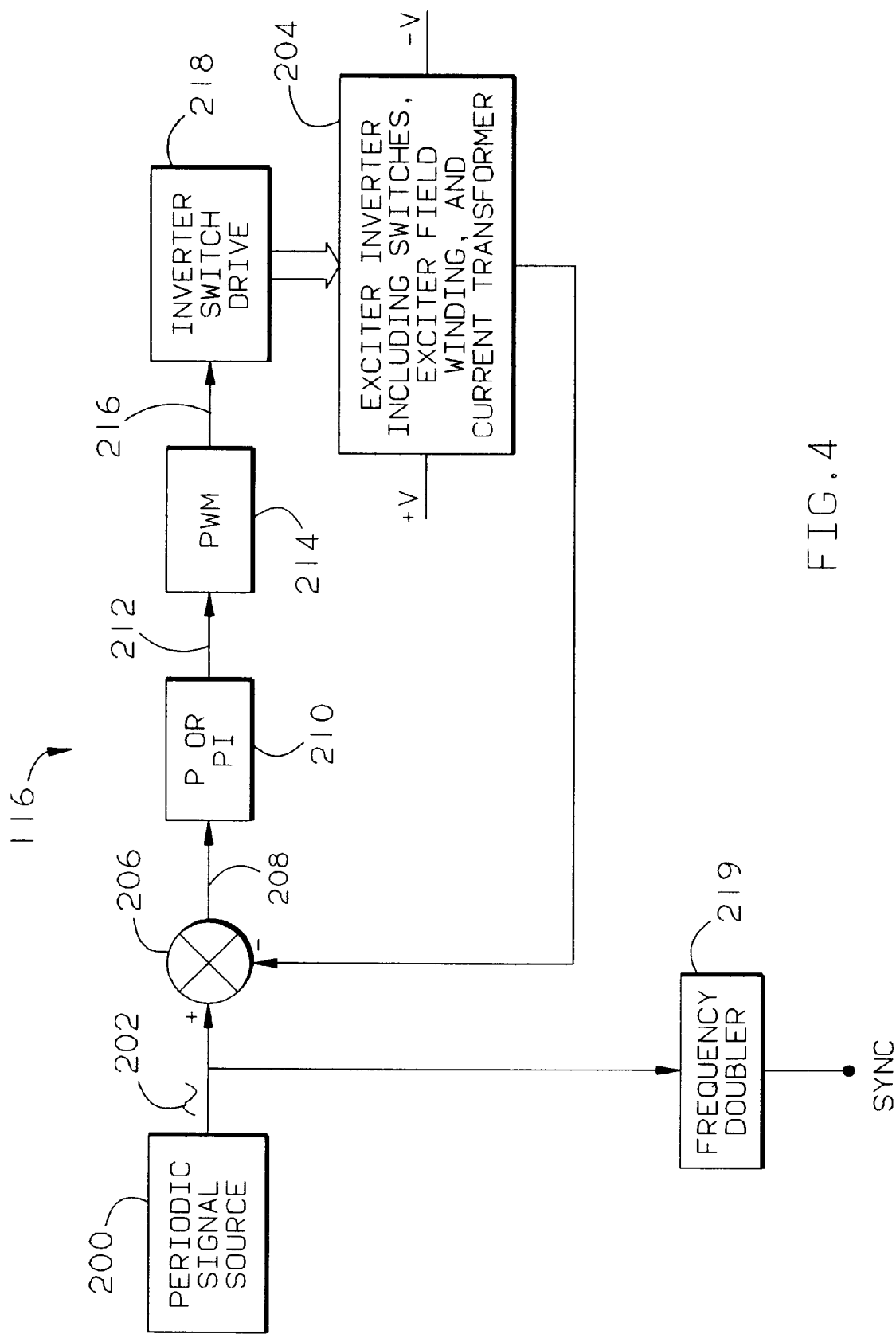
FIG. 4 is a block diagram of a conventional excitation circuit of an exciter of a brushless motor generator system in accordance with FIGS. 1 and 2 which has been modified to produce a synchronization signal used for detection of the amplitude modulation of the voltage across each non-commutated stator phase winding.

FIG. 4 illustrates a modification of a conventional excitation circuit of an exciter of a brushless generator system in accordance with the prior art of FIGS. 1 and 2 to produce a necessary synchronization signal SYNC having twice the frequency of excitation of the field winding of the exciter 102 for use in synchronous detection of the amplitude modulation of the voltage across each non-commutated stator phase winding of the main motor generator 105. A periodic signal source 200 produces output sinusoidal waveform 202 having a frequency above the highest commutation speed of the switches in the main inverter 114. Typical frequencies of the sinusoidal wave produced by the periodic signal source 200 are between 400 and 1,000 Hz. The output envelope of the sinusoidal waveform 202 may be amplitude modulated (not illustrated) inversely in proportion to an output shaft speed signal representing the speed of rotation of the output shaft of the prime mover to which the rotors of the exciter 102 and the main motor generator 105 are connected as illustrated for example in FIG. 1. The purpose of modulating the amplitude of the sinusoidal waveform 202 inversely in proportion to the output shaft speed is to provide field weakening at high speed. A feedback representing the current in the exciter field winding is applied to a subtracting input of summer 206 which computes a difference between the amplitude modulated sinusoidal waveform 202 applied to an additive input of the summer. The output signal 208, which is equal to a difference between the amplitude modulated sinusoidal signal 202 and the feedback from the exciter field winding is an error control voltage for insuring that the alternating current in the exciter field winding tracks the sinusoidal waveform 202. The error control signal 208 is applied to a proportional and integrating amplifier 210. The use of an integrating function is for the purpose of reducing steady state error. However, only proportional amplification of the error control signal 208 may be used. The output 212 of the proportional or proportional and integrating amplifier 210 is applied to a pulse width modulation 214 which has a steady state switching frequency between 10 and 20 KHz and produces a square wave output when the input 212 is zero. The output 216 of the pulse width modulator 214 is applied to inverter switch drive 218 which provides switching control signals to the switches in a conventional full or H bridge inverter which controls the flow of current in the exciter field winding within the box 204 containing the exciter inverter including switches, exciter field winding and current transformer which accurately tracks the frequency of the sinusoidal waveform 202. The aforementioned parts of the exciter are conventional when used in a starting mode such as with the prior art system as illustrated in FIG. 2.

The present invention requires a synchronization signal SYNC for synchronously detecting the amplitude modulation of the feed through of the voltage at twice the fundamental frequency in each non-commutated stator phase winding of the main motor generator 105 provided by the exciter excitation as a consequence of the frequency doubling produced by rotating rectifier 104 of the excitation produced by the rotor of the exciter. The synchronization signal SYNC is produced by a frequency doubler 219, which may be a fullwave rectifier, which has input connected to the output of the periodic source 200 which fullwave rectifies the sinusoidal waveform 202 to double the frequency therein to produce the synchronization signal SYNC on the output thereof.

Figure 5:
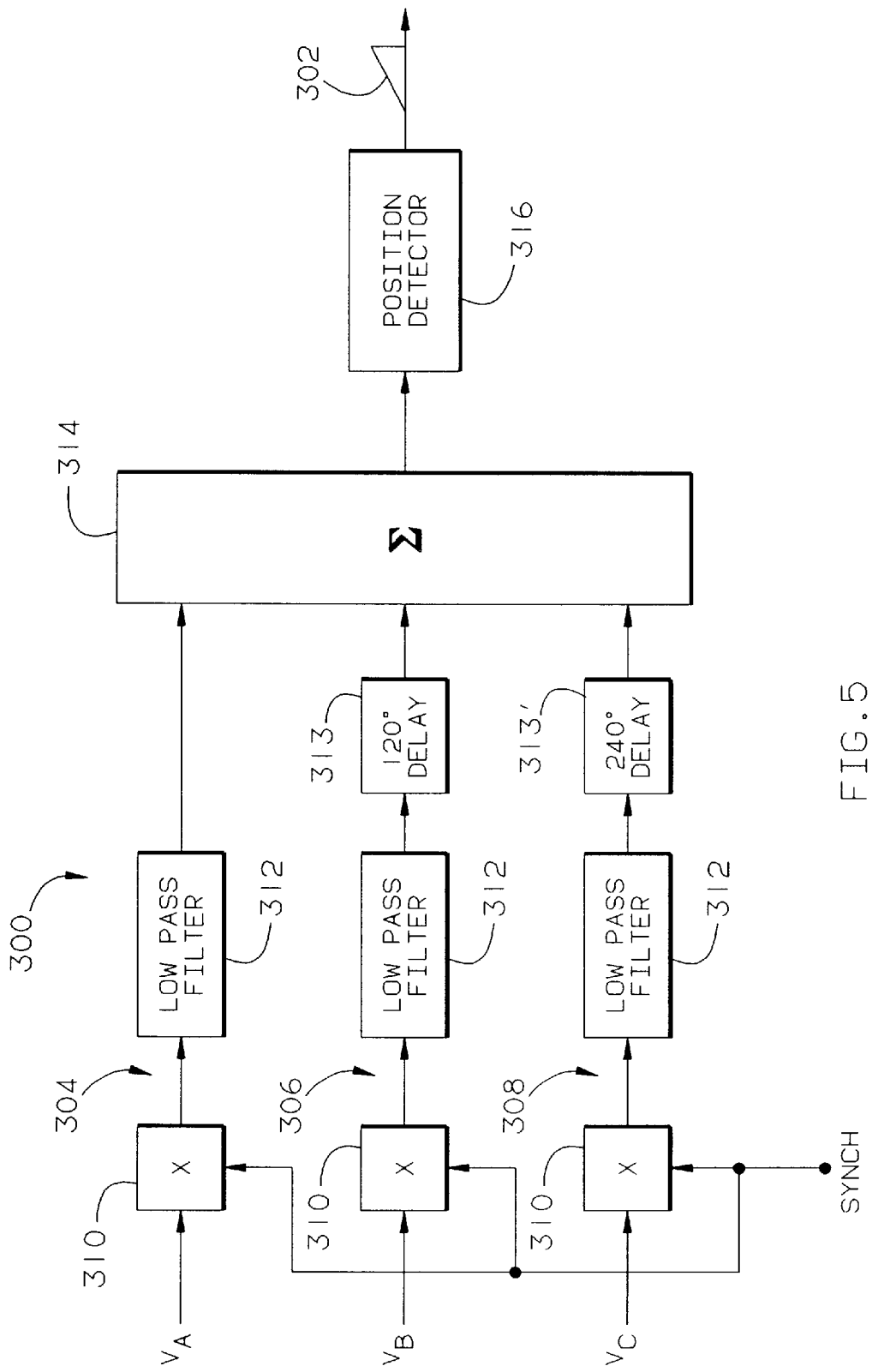
FIG. 5 is a block diagram of an embodiment of circuitry used for generation of the rotor position signal used for control of commutation of the stator phase windings which are not maintained in a non-commutated state during operation of the motor generator system as a motor.

FIG. 5 illustrates an embodiment of a synchronous detector 300 of the amplitude modulation of the voltage across each stator phase winding of the main motor generator 105 which is maintained in a non-commutated state by the main inverter controller 119. The amplitude modulation of the voltage present on each non-commutated stator winding contains information representing the position of the aligned rotors of the motor generator system 120 of the present position and the output shaft of the prime mover. The output voltages VA-VC are the voltages present in the stator windings of the main motor generator 105 during operation as a motor with the main inverter control 119 sequentially switching off each stator phase winding twice during each rotation of the output shaft and rotors such that each stator phase winding may be for example be deactivated for 60° followed by 120° of commutation followed by 60° of being deactivated followed by 120° of commutation in response to the rotor position signal 302 which preferably is a sawtooth which cycles between zero and a maximum over 360°. The non-commutated states of the stator phase windings are non simultaneous (non overlapping) and the non-commutated states of the different stator windings are offset in a leading and lagging manner from other windings by 120° so that only one stator phase winding is deactivated at any one time.

The inputs VA-VC from the stator phase windings of the main motor generator 105 are applied in three identical processing channels 304, 306 and 308 which each contain a synchronous detector 310 which detects the amplitude modulation of the voltage at twice the fundamental frequency in the respective channels when the main inverter 114 has maintained only the stator winding coupled to that channel in the non-commutated state for 60°. The low pass filters 312 have a cutoff frequency below twice the fundamental frequency to avoid passing any component at twice the fundamental frequency which would interfere with the outputting of the rotor position control signal 302. A phase delay 313 of 120° at twice the fundamental frequency is placed in channel 306 and a phase delay 313' of 240° is placed in the channel 308 to make each of the inputs to summer 314 in phase for summation and subsequent position detection by position detector 316. The synchronous detectors 310 are driven by the synchronization signal SYNC at twice the fundamental frequency. The summer 314 sums all of the outputs from channels 304, 306 and 308 so that the output of the summer 314 is always outputting the detected amplitude modulation of the voltage at twice the frequency of the fundamental frequency from the single stator phase winding which is maintained in a non-commutated state. The position detector 316, which may use zero crossing information, outputs the aforementioned sawtooth wave 302 which varies from zero to a maximum linearly over 360° of rotation of the rotors and the output shaft. The signal 302 is used by the main inverter control 119 in a conventional manner to control commutation in the different pairs of stator phase windings which at any one time are being commutated during operation of the main motor generator 105 as a motor while a remaining stator phase winding is in a non-commutated state.

While the invention has been described in terms of its preferred embodiments, it should be understood that numerous modifications may be made thereto without departing from the spirit and scope of the invention. It is intended that all such modifications fall within the scope of the appended claims.

We claim:

1. A motor generator system comprising:
   a prime mover for driving an output shaft;
   a main motor generator, having a rotor driven by the output shaft, for producing electrical power on a plurality of stator phase windings in response to the prime mover rotating the output shaft and for driving the output shaft in response to operation as a motor;
   an exciter, having a rotor driven by the output shaft, for applying excitation to a field winding of the main motor generator during operation for producing electrical power on the plurality of stator phase windings and for applying current to the field winding of the main motor generator to produce a magnetic field in the field winding during operation of the main motor generator as a motor;
   a time varying signal source for applying a time varying signal having a fundamental frequency to a field winding of the exciter;
   a main inverter, responsive to a rotor position signal representing a rotary position of the rotor of the main motor generator, for commutating application of current to at least one of the plurality of stator phase windings to control operation of the main motor generator during operation as motor while simultaneously maintaining one of the plurality of stator phase windings in a non-commutated state in which no current is caused to flow therein by the main inverter; and circuitry for demodulating an amplitude modulation of voltage across the non-commutated phase winding wherein the amplitude modulation of voltage has a frequency twice the fundamental frequency and is representative of the rotary position of the rotor of the main motor generator and producing the rotor position signal in response to the demodulated amplitude modulation of voltage to control commutation of current in at least one of the plurality of stator phase windings.

2. A motor generator system in accordance with claim 1, wherein the circuitry comprises:

a frequency doubler, responsive to the time varying signal source, for outputting a synchronization signal having a frequency of twice the fundamental frequency; and a synchronous detector, coupled to the synchronization signal and to the phase winding maintained in a non-commutated state, for detecting the amplitude modulation of the voltage at twice the fundamental frequency.

3. A motor generator system in accordance with claim 2, wherein:

the detected amplitude modulation of the voltage at twice the fundamental frequency is coupled to a low pass filter having a cutoff frequency below twice the fundamental frequency.

4. A motor generator system in accordance with claim 3, further comprising:

a position detector, coupled to an output of the low pass filter, for producing the rotor position control signal.

5. A motor generator system in accordance with claim 1, wherein the circuitry comprises:

a frequency doubler, responsive to the time varying signal source, for producing a synchronization signal having a frequency of twice the fundamental frequency;

a plurality of synchronous detectors equal in number to a number of the plurality of stator phase windings, each synchronous detector being coupled to the synchronization signal and to a different one of the plurality of stator phase windings;

a summer, coupled to an output of each of the plurality of synchronous detectors, for producing an output signal representing the detected amplitude modulation of the voltage at twice the fundamental frequency; and wherein the main inverter controls the commutation of current in the plurality of stator phase windings over 360° of rotation of the rotor of the main motor generator so that each stator phase winding is maintained as a non-commutated state for at least one time interval during the 360° of rotation.

6. A motor generator system in accordance with claim 5, further comprising:

a plurality of low pass filters equal in number to a number of the plurality of phase windings, each low pass filter having an input coupled to an output of a different synchronous detector and an output coupled to the summer with each low pass filter having a cutoff frequency below twice the fundamental frequency.

7. A motor generator system in accordance with claim 6 further comprising:

the main motor generator has three stator phase windings with each stator phase winding being in a non-commutated state twice during the 360° of rotation with the non-commutated state of each phase winding being spaced apart by 180°.

8. A motor generator system in accordance with claim 5, further comprising:

a position detector, coupled to an output of the summer, for producing the rotor position signal.

9. A motor generator system in accordance with claim 6, further comprising:

a position detector, coupled to an output of the summer, for producing the rotor position signal.

10. A motor generator system in accordance with claim 7, further comprising:

a position detector, coupled to an output of the summer, for producing the rotor position signal.

11. A motor generator system in accordance with claim 1, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

12. A motor generator system in accordance with claim 2, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

13. A motor generator system in accordance with claim 3, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

14. A motor generator system in accordance with claim 4, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

15. A motor generator system in accordance with claim 5, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

16. A motor generator system in accordance with claim 6, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

17. A motor generator system in accordance with claim 7, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

18. A motor generator system in accordance with claim 8, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

19. A motor generator system in accordance with claim 9, further comprising:

a permanent magnet generator; and wherein:

the permanent magnet generator, the exciter and the main motor generator have three electrical phases and rotors mounted on the output shaft with the permanent magnet generator, exciter and main motor generator being brushless; and the prime mover is a gas turbine.

20. A method of commutation of a motor generator system having a prime mover for driving an output shaft, a main motor generator having a rotor driven by the output shaft for producing electrical power on a plurality of phase windings in response to the prime mover rotating the output shaft and for driving the output shaft in response to operation as a motor, an exciter having a rotor driven by the output shaft for applying excitation to a field winding of the main motor generator during operation for producing electrical power on the plurality of phase windings and for applying current to the field winding of the main motor generator to produce a magnetic field in the field winding during operation of the main motor generator during operation as a motor and a main inverter, responsive to a rotor position signal representing a rotary position of the rotor of the main motor generator, for commutating application of current to at least one of the plurality of phase windings to control operation of the plurality of phase windings to control operation of the main motor generator during operation as a motor comprising:

applying a time varying signal having a fundamental frequency to a field winding of the exciter during operation of the main motor generator as a motor while simultaneously maintaining one of the plurality of phase windings in a non-commutated state in which no current is caused to flow therein by the main inverter;

demodulating an amplitude modulation of voltage across the non-commutated phase winding wherein the amplitude modulation of voltage has a frequency twice the fundamental frequency and is representative of the rotary position of the rotor of the main motor generator; and producing the rotor position signal in response to the demodulated amplitude modulation of voltage to control commutation of current in at least one of the plurality of phase windings.

21. A method in accordance with claim 20, wherein:

the detection of the amplitude modulation of the voltage is a synchronous detection responsive to a synchronization signal having a frequency of twice the fundamental frequency.

22. A method in accordance with claim 20, wherein:

the rotor position signal is produced by phase detection of the detected amplitude modulation in response to the synchronization signal.

* * * * *